Jan. 11, 1955 G. W. PACKER 2,699,190
SHAKER CONVEYER CLAMP
Filed March 8, 1952
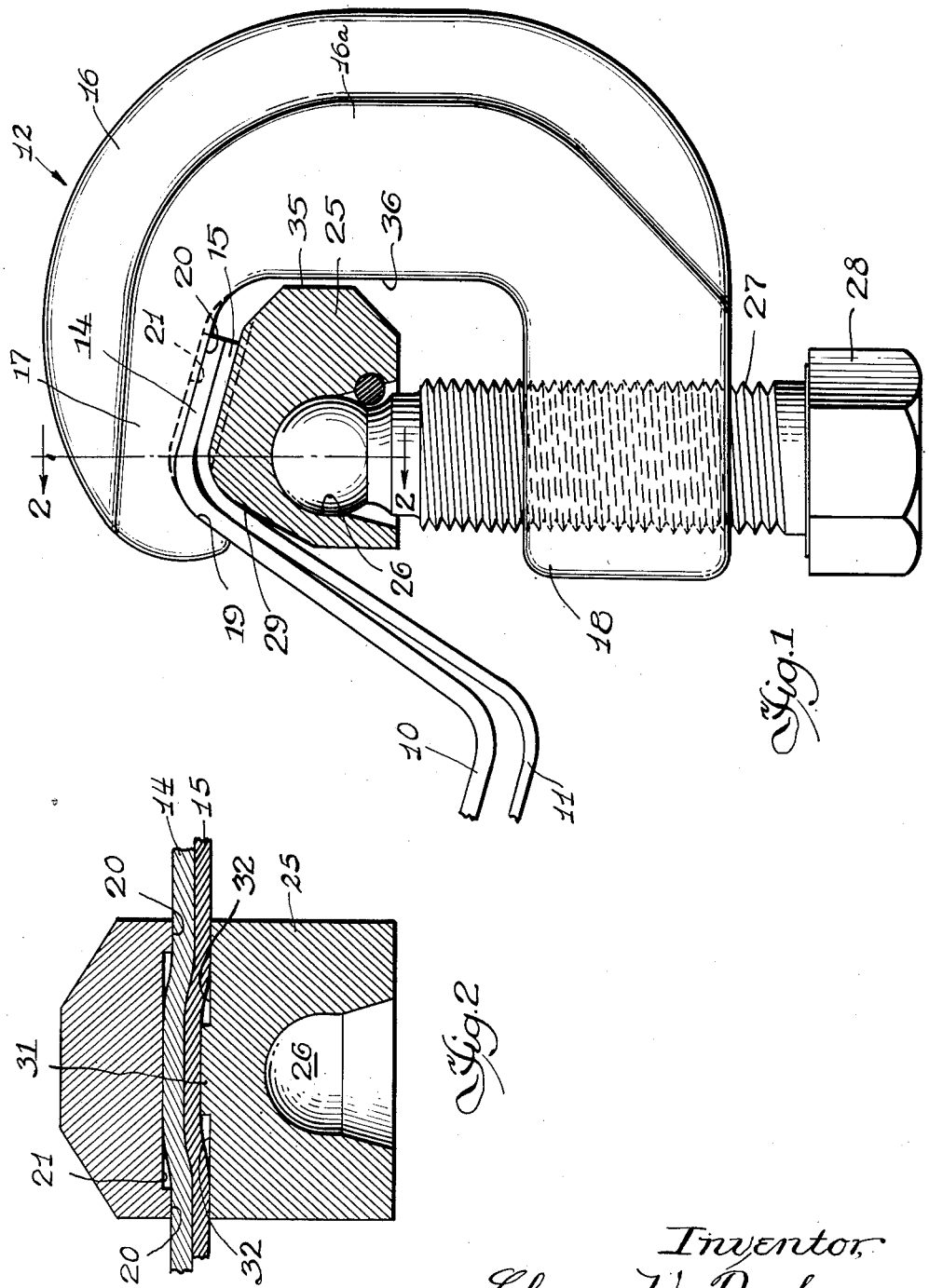
Inventor
Glenn W. Packer,
By: Murray A. Gleeson
Atty

United States Patent Office 2,699,190
Patented Jan. 11, 1955

2,699,190

SHAKER CONVEYER CLAMP

Glenn W. Packer, Chicago, Ill., assignor to Goodman Manufacturing Company, Chicago, Ill., a corporation of Illinois Application March 8, 1952, Serial No. 275,641

1 Claim. (Cl. 144—304)

This invention relates to improvements in clamping devices especially adapted for clamping telescopic trough sections of a shaker conveyor together, although not limited to such use.

Shaker conveyors having extensible pick-up shovels on their receiving ends are commonly provided with two telescopic trough sections in the trough line, so as to permit extension of the pick-up shovel for the length permitted by the telescopic trough sections, instead of inserting an additional trough section in the line. These telescopic trough sections are usually held together by gripping devices, as for instance C-clamps of various forms applied to the lapped side flanges of said trough sections. However, the C-clamps heretofore used are generally unsatisfactory in that, when they are sufficiently tightened to positively hold the telescopic troughs against relative movement during the shaking movement of the trough line, the gripping surfaces along the side flanges of the trough sections are often permanently deformed or marred to the extent that the strength of the troughs is impaired, and the trough sections cannot thereafter slide quickly and easily with respect to each other in making desired telescopic adjustments of the trough line. This shortcoming of conventional C-clamps is particularly troublesome when relatively thin-walled troughing, or troughing made of relatively light metal such as aluminum is employed.

The principal object of the present invention is to provide an improved and efficient clamping device for telescopic troughs and the like, so designed as to secure the troughs together by engagement of their side flanges at at least three alternate points, but under such a limited bending stress distributed over a wide area as to avoid permanent deformation of the trough flanges.

Other objects and advantages of the invention will appear as the following description proceeds.

The invention may best be understood by reference to the accompanying drawing, in which:

Figure 1 is a fragmentary transverse section showing one side of a trough line with my improved clamping device mounted in gripping relation against the side flanges of nesting trough sections of said trough line, with part of the clamping device shown in section;

Figure 2 is a detailed section taken on line 2—2 of Figure 1.

In the embodiment of the invention illustrated in the drawing, a portion of the telescopic trough section 10 is nested in a trough section 11. My novel C-clamp 12 is shown as engaging said trough sections at one side thereof, it being understood that two or more similar clamps are used to connect said trough sections together, with at least one clamp being on each side thereof. Said trough sections are of a well-known form used in shaker conveyors, as herein shown having outwardly extending side flanges 14 and 15, respectively, extending along opposite sides thereof.

The clamping device 12 has a relatively heavy, rigid C-shaped frame 16 with an upright main body 16a and inwardly extending upper and lower jaws 17 and 18 formed integrally therewith. The upper jaw 17 has what can be termed minor and major gripping surfaces. The minor gripping surface consists of a downwardly curved lip 19 at its outer end shaped generally to conform with the curvature of the troughs where their side flanges merge into their side walls. The major gripping surface of the upper jaw 17 extends between the downwardly curved lip 19 and the upright body 16a of the clamp, and consists of two coplanar depending ribs or abutment faces 20, 20 along opposite sides of the jaw, and having square shoulders on opposite sides of a shallow recess or abutment face 21 therebetween, as shown in Figure 2. An adjustable grip block 25 is connected by a ball-and-socket joint, indicated generally at 26, to the upper end of a screw 27 which is threaded through the lower jaw 18.

The upper face of the grip block 25 has a minor gripping surface consisting of a downwardly curved outwardly facing portion 29 conforming generally to the opposed terminal lip 19 of the upper jaw 17. The major gripping surface of the grip block 25 extends from the curved outwardly facing surface 29 inwardly toward the body 16a of the clamp, said main gripping surface consisting of a centrally disposed shallow tongue forming a male abutment face 31 adapted for interfitting engagement in the female recess 21, and offset with square shoulders above laterally extending coplanar abutment faces 32, 32 which are generally parallel to the upper surface of the tongue 31. As will be seen from Figure 2, the central tongue 31 on the grip block 25 is of the same height as the ribs 20, 20 but is considerably narrower than the opposed female recess 21 on the under face of the upper jaw 17 so as to be offset a considerable distance from each of the ribs 20, 20 in a direction longitudinally of the trough edges.

As will be seen from Figure 1, the major clamping surface of the upper jaw 17 formed by the ribs 20 and the intervening recess 21 is disposed generally at an outwardly flared angle with respect to the main body 16a of the clamp. The grip block 25 is provided with a rearwardly projecting portion 35 forming an upright guide surface spaced slightly from the opposed wall 36 of the main body 16a of the clamp between the upper and lower jaws, so as to maintain the upper clamping surfaces of the grip block substantially in parallel relation with the opposed gripping surfaces of the upper jaw 17 in the various adjustable positions of the grip block.

The clamping screw 27 is provided with a head 28 for adjusting the grip block by means of a suitable tool.

The use and operation of the device is as follows:

The clamp is applied to the trough flanges 14 and 15 of two telescopic trough sections 10 and 11 in the manner indicated in Figures 1 and 2, in which it will be seen that the adjusting screw 27 is manually turned to advance the grip block 25 toward the upper jaw 17. The opposed minor gripping surfaces 19 and 29 on the outer ends of the upper jaw 17 and the grip block, respectively, and the main gripping surfaces of said jaw and block, are designed to conform closely to the cross-sectional shape of the flanged edges of the trough sections 10 and 11, so that the clamp will automatically assume its proper seating relation along the trough edges transversely thereof as clamping pressure is being initially applied by the screw 27. It will be observed in Figure 1 that the apex formed at the juncture of curved outer face 29 and the relatively straight major gripping surface on the grip block is substantially in alignment with the axis of the clamping screw 27.

The central tongue 31 on the grip block is of substantially the same height as the lateral ribs 20, 20 on the upper jaw 17, and said ribs are spaced apart a substantial distance from opposite sides of said tongue so that, when the two trough edges 14 and 15 are gripped between the jaw 17 and the block 25, said trough edges tend to be temporarily deformed or offset to a limited degree in parallel relation along gentle reversed arcs near the center of the clamp, terminating in the spaces between abutments 31 and 20, but with the trough edges projecting in parallel coplanar relation with each other from both sides of the clamp, as shown in Figure 2.

The arcuate deformation of the trough edges, as thus limited by the heights and dispositions of the opposed abutment faces, imposes in effect an alternate 3-point clamping pressure on the trough edges, which is maintained well within the yield points of said trough edges, thus protecting the latter from any permanent deformation such as is likely to be produced with clamping devices of the kind previously employed for similar purposes. Accordingly, when the clamping pressure is removed from the trough edges, they will normally reassume their normal condition, coplanar with the remaining portions of said trough edges, so that said trough sections may slide easily and be moved longitudinally of each other for telescopic readjustment of said sections to other positions.

Although I have shown and described a certain embodiment of my invention, it will be understood that I do not wish to be limited to the exact construction shown and described, but that various changes and modifications may be made without departing from the spirit and scope of the invention as defined in the appended claim.

I claim:

A clamping device for connecting the flanged edges of lapped trough sections and the like, comprising a C-shaped frame with opposed rigid jaws, a grip block mounted on one of said jaws for adjustable movement toward and away from the second jaw, said block and said second jaw being each provided with coplanar abutment faces along opposite side edges thereof and substantially square-shouldered centrally disposed male and female abutment faces of equal height and depth, respectively, parallel with their respective coplanar abutment faces, the male abutment face being substantially narrower than the female abutment face whereby the block and jaw may clamp the margins of lapping sheet metal members to produce a parallel offset deformation thereof terminating in relatively flat reversed curves, and with the opposed parallel abutment faces along opposite side edges of the clamp holding the projecting portions of the lapped sheet metal members in parallel coplanar relation with each other at both sides of the clamp, and both of the opposed abutment faces also having contiguous minor concave and convex outer gripping faces for interfitting engagement with correspondingly shaped portions of the trough sections to be connected.

References Cited in the file of this patent

UNITED STATES PATENTS

| | | |
|---|---|---|
| 855,989 | Shear et al. | June 4, 1907 |
| 986,501 | Roberts | Mar. 14, 1911 |
| 1,426,026 | Webster | Aug. 15, 1922 |
| 1,497,107 | Lasell | June 10, 1924 |
| 1,660,493 | Proctor | Feb. 28, 1928 |
| 2,431,439 | Williams | Nov. 25, 1947 |